(12) United States Patent
Itani et al.

(10) Patent No.: US 8,089,457 B2
(45) Date of Patent: Jan. 3, 2012

(54) IMAGE OPERATING DEVICE, IMAGE OPERATING METHOD, AND IMAGE OPERATING PROGRAM EMBODIED ON COMPUTER READABLE MEDIUM

(75) Inventors: Satoru Itani, Osaka (JP); Yuji Mizuguchi, Kanagawa (JP); Atsushi Yamashita, Osaka (JP)

(73) Assignee: Panasonic Corporation, Osaka (JP)

( * ) Notice: Subject to any disclaimer, the term of this patent is extended or adjusted under 35 U.S.C. 154(b) by 647 days.

(21) Appl. No.: 12/300,697

(22) PCT Filed: Apr. 23, 2007

(86) PCT No.: PCT/JP2007/058729
§ 371 (c)(1),
(2), (4) Date: Nov. 13, 2008

(87) PCT Pub. No.: WO2007/135835
PCT Pub. Date: Nov. 29, 2007

(65) Prior Publication Data
US 2009/0244004 A1    Oct. 1, 2009

(30) Foreign Application Priority Data

May 19, 2006    (JP) ................................. 2006-139935

(51) Int. Cl.
*G06F 3/033* (2006.01)
(52) U.S. Cl. ...................................... 345/157
(58) Field of Classification Search ......................... None
See application file for complete search history.

(56) References Cited

U.S. PATENT DOCUMENTS 5,689,284 A    11/1997  Herget

FOREIGN PATENT DOCUMENTS

| JP | 06-282368 | 10/1994 |
|----|-----------|---------|
| JP | 06-282401 | 10/1994 |
| JP | 08-044490 | 2/1996 |
| JP | 8-221196 | 8/1996 |
| JP | 10-254355 | 9/1998 |
| JP | 2003-085590 | 3/2003 |

OTHER PUBLICATIONS

International Search Report issued Jul. 10, 2007 in the International (PCT) Application of which the present application is the U.S. National Stage.

*Primary Examiner* — Paul Huber
(74) *Attorney, Agent, or Firm* — Wenderoth, Lind & Ponack, L.L.P.

(57) ABSTRACT

An image operating device which is inexpensive and capable of allowing a user to understand to what extent an image operation of movement, enlargement and reduction, rotation or the like is performed on an image. The image operating device that performs an operation on a display image comprises: an image display section (14) for displaying an image on a screen; an image operating section (13) for performing a predetermined image operation on the image displayed on the image display section (14); a position designating section (12) for designating a first point which is any point on the screen by means of a single-point input device and for further designating a position, on the screen, to where the first point is to be moved as a result of the image operation performed by the image operating section (13); and a pointer display section for displaying a first pointer image at the position designated by the position designating section (12), and for further displaying a second pointer image at a position symmetrical to the first pointer image with respect to a center point of rotation and/or enlargement and reduction when the image operation of rotation and/or enlargement and reduction is performed by the image operating section.

15 Claims, 10 Drawing Sheets

F I G. 1 3

| IMAGE NAME | IMAGE OPERATION PARAMETER (POSITION, ROTATIONAL ANGLE, WIDTH, HEIGHT AND DISPLAYABILITY) |
|---|---|
| MAP IMAGE | { (0, 0), 45, 800, 600, TRUE } |
| LEFT IMAGE | { (-100, 0), 0, 200, 300, TRUE } |
| RIGHT IMAGE | { (100, 0), 0, 200, 300, FALSE } |

IMAGE OPERATING DEVICE, IMAGE OPERATING METHOD, AND IMAGE OPERATING PROGRAM EMBODIED ON COMPUTER READABLE MEDIUM

This application is a 371 of PCT/JP2007/058729, filed Apr. 23, 2007.

TECHNICAL FIELD

The present invention relates to an image operating device, an image operating method and an image operating program that operate a display image, and more particularly to an image operating device, an image operating method and an image operating program capable of allowing a user to understand to what extent an image operation is performed on a display image.

BACKGROUND ART

As a conventional image operating device that operates an image, particularly a map image, patent document 1, for example, discloses a technique in which an image operating device, configured by map image operation display means including a map image and an operation menu, performs an image operation on the map image by using an image operating method selected through the operation menu.

The image operating device uses a technique in which an image is operated by using a general pointing device (a single-point input device) such as a mouse. More specifically, when a user wishes to rotate an image included in a visible area clockwise, for example, he or she clicks a menu of "clockwise rotation" of the operation menu included in an area different from the visible area, thereby causing the image included in the visible area to be rotated clockwise accordingly.

[Patent document 1] Japanese Patent Publication No. 10-254355

In the conventional image operating device, however, when the user cannot find a characteristic target object such as a road or a building in a displayed map image, it has been impossible for him or her to understand to what extent an image operation of enlargement and reduction, rotation or the like is performed on the map image. For example, in the case where a road extending in a vertical direction is displayed within the visible area and rotation is performed thereon, thereby causing the road displayed within the visible area to extend in a horizontal direction, the user believes that the image has been rotated by 90 degrees (or 270 degrees). However, depending on a displayed area or a scale, there may be a case where any target object, which can be such a landmark, does not exist within the visible area, and thus it has been difficult for the user to intuitively understand an amount of the image operation.

Furthermore, although in recent years, an image operating device comprising a multi-point input device, which is able to input multiple points, has emerged and it made it possible to perform an operation to allow the user to intuitively understand the amount of the image operation, the multi-point input device is exclusive and expensive, and has a complex configuration.

Therefore, the present invention solves the problem mentioned above. Specifically, an object of the present invention is to provide an image operating device, an image operating method and an image operating program, all of which are inexpensive and capable of allowing the user to understand to what extent the image operation of movement, enlargement and reduction, rotation or the like is performed on an image.

SUMMARY OF THE INVENTION

A first aspect of the present invention is directed to an image operating device that performs an operation on a display image. The present invention comprises: an image display section for displaying an image on a screen; an image operating section for performing a predetermined image operation on the image displayed on the image display section; a position designating section for designating a first point which is any point on the screen by means of a single-point input device and for further designating a position, on the screen, to where the first point is to be moved as a result of the image operation performed by the image operating section; and a pointer display section for displaying a first pointer image at the position designated by the position designating section, and for further displaying a second pointer image at a position symmetrical to the first pointer image with respect to a center point of rotation and/or enlargement and reduction when the image operation of rotation and/or enlargement and reduction is performed by the image operating section.

Thus, it becomes possible to provide an inexpensive image operating device capable of allowing the user to understand to what extent the image operation of movement, enlargement and reduction, rotation or the like is performed on an image.

It is preferable that at least one of the pointer images is an image captured by a camera. Thus, at least one of the pointer images is an image captured by the camera, thereby allowing the user to feel as if the pointer image is a part of his or her own body and thus an operation feeling is significantly improved.

It is preferable that the two pointer images are horizontally flipped shapes of each other. Thus, the two pointer images are horizontally flipped shapes of each other, thereby allowing the user to distinguish the pointer image he or she is currently operating from the pointer image displayed as an auxiliary image thereof and also not to feel awkward about the two pointer images being operated in pairs, and thus an intuitive operation is realized.

It is preferable that the two pointer images are images of hands, one of which representing a left hand and the other of which represents a right hand. Thus, the two pointer images are images of hands, one of which represents a left hand and the other of which representing a right hand, thereby allowing the user to feel as if he or she performs the image operation by using both of his or her hands, and thus the operation feeling is significantly improved.

It is preferable that the pointer image on a left side of the center point is the image of the left hand, and the pointer image on a right side of the center point is the image of the right hand. Thus, the pointer image on a left side of the center point is the image of the left hand, and the pointer image on a right side of the center point is the image of the right hand, thereby allowing the user to feel that the pointer images are displayed in a natural manner, and thus an intuitive operation can be performed.

It is preferable that when the image operating section performs the image operation of rotation and/or enlargement and reduction, the image operation is performed centered on a center of the image display section as the center point. Thus, when the image operating section performs the image operation of rotation and/or enlargement and reduction, the image operation is performed centered on a center of image display means as the center point, thereby allowing the user to perform, when a target image of the image operation is larger than the image display section, the image operation without considering a shape of an entire image or which portion of the entire image the image currently displayed is located, and thus an operation load of the user is reduced and a comfortable operation feeling is realized.

It is preferable that the center point can be set at any position. Thus, the center point can be set at any position, whereby the image operation can be performed with a desired point of an image being fixed to any position on the image display section, and thus a convenience of the image operation is improved.

It is preferable that the image operating section does not perform the image operation when the center point is designated by the position designating section, and modifies a position of the center point to a position subsequently designated by the position designating section. Thus, the image operating section does not perform the image operation when the center point is designated by the position designating section, and modifies a position of the center point to a position subsequently designated by the position designating section, thereby making it possible to easily modify the position of the center point only with a simple operation performed by the position designating section without any special means or display for modifying the position of the center point.

It is preferable that the image operating section determines an image operating method depending on whether or not the first point designated by the position designating section is located within a predetermined area of the image displayed on the image display section. Thus, the image operating section determines an image operating method depending on whether or not the first point designated by the position designating section is located within a predetermined area of the image displayed on the image display section, whereby it is unnecessary to display an operation menu which obstructs the map image and thus a map operation can be performed by effectively using an entirety of the display screen.

It is preferable that the predetermined area has a reduced shape of the image displayed on the image display section and also included in a display area thereof. Thus, the predetermined area has a shape obtained by reducing a shape of the image displayed on the image display section and also included in a display area thereof, thereby allowing the user to easily understand, based on an area in which an operation image is displayed, the boundary of the area on which an operation method is to be shifted even when the boundary of the area is not displayed, and thus the convenience of the image operation is improved.

It is preferable that the predetermined area has an elliptical shape centered on a center point or a barycentric point of a shape of the image displayed on the image display section and also included in a display area thereof. Thus, the predetermined area has an elliptical shape centered on a center point or a barycentric point of a shape of the image displayed on the image display section and also included in a display area thereof, thereby allowing the user to easily imagine an elliptical shape based on an operation method of rotating an operation image even when the boundary of the area is not displayed, and thus it becomes possible for the user to understand the boundary of the area on which the operation method is to be shifted.

It is preferable that any position and/or any shape can be set for the predetermined area. Thus, any position and/or any shape can be set for the predetermined area, thereby making it possible to set the area in accordance with the preference of the user even when he or she feels uncomfortable about the operation during the image operation, and thus an operation environment with a high convenience is provided.

It is preferable that the image operating section does not perform the image operation when a position on a boundary of the predetermined area or on an area indicating the boundary of the predetermined area is designated by the position designating section, and changes the position on the boundary or on the boundary area to a position subsequently designated by the position designating section so as to modify the boundary or the boundary area. Thus, the image operating section does not perform the image operation when a position on a boundary of the predetermined area or on an area indicating the boundary of the predetermined area is designated by the position designating section, and changes the position on the boundary or on the boundary area to a position subsequently designated by the position designating section so as to modify the boundary or the boundary area, thereby making it possible to easily modify the position and/or the shape of the area only with a simple operation performed by the position designating section without any special means or display for modifying the position and/or the shape of the area.

A second aspect of the present invention is directed to an image operating method that performs an operation on a display image. The present invention comprises: an image display step of displaying an image on a screen; an image operating step of performing a predetermined image operation on the image displayed by the image display step; a position designating step of designating a first point which is any point on the screen by means of a single-point input device and of further designating a position, on the screen, to where the first point is to be moved as a result of the image operation performed by the image operating step; and a pointer display step of displaying a first pointer image at the position designated by the position designating step, and of further displaying a second pointer image at a position symmetrical to the first pointer image with respect to a center point of rotation and/or enlargement and reduction when the image operation of rotation and/or enlargement and reduction is performed by the image operating step.

Thus, it becomes possible to provide an inexpensive image operating method capable of allowing the user to easily understand to what extent the image operation of movement, enlargement and reduction, rotation or the like is performed on an image.

A third aspect of the present invention is directed to an image operating program to be executed by a computer of an image operating device that performs an operation on a display image. The present invention instructs the computer to execute: an image display step of displaying an image on a screen; an image operating step of performing a predetermined image operation on the image displayed by the image display step; a position designating step of designating a first point which is any point on the screen by means of a single-point input device and of further designating a position, on the screen, to where the first point is to be moved as a result of the image operation performed by the image operating step; and a pointer display step of displaying a first pointer image at the position designated by the position designating step, and of further displaying a second pointer image at a position symmetrical to the first pointer image with respect to a center point of rotation and/or enlargement and reduction when the image operation of rotation and/or enlargement and reduction is performed by the image operating step.

Thus, it becomes possible to provide an inexpensive image operating program capable of allowing the user to easily understand to what extent the image operation of movement, enlargement and reduction, rotation or the like is performed on an image.

EFFECT OF THE INVENTION

As described above, according to the respective aspects of the present invention, it becomes possible to provide an image operating device, an image operating method and an image operating program, all of which are inexpensive and capable of allowing the user to understand to what extent the image operation of movement, enlargement and reduction, rotation or the like is performed on an image.

BRIEF DESCRIPTION OF THE DRAWINGS

FIG. 13 is a diagram describing image operation parameters.

Figure 1:
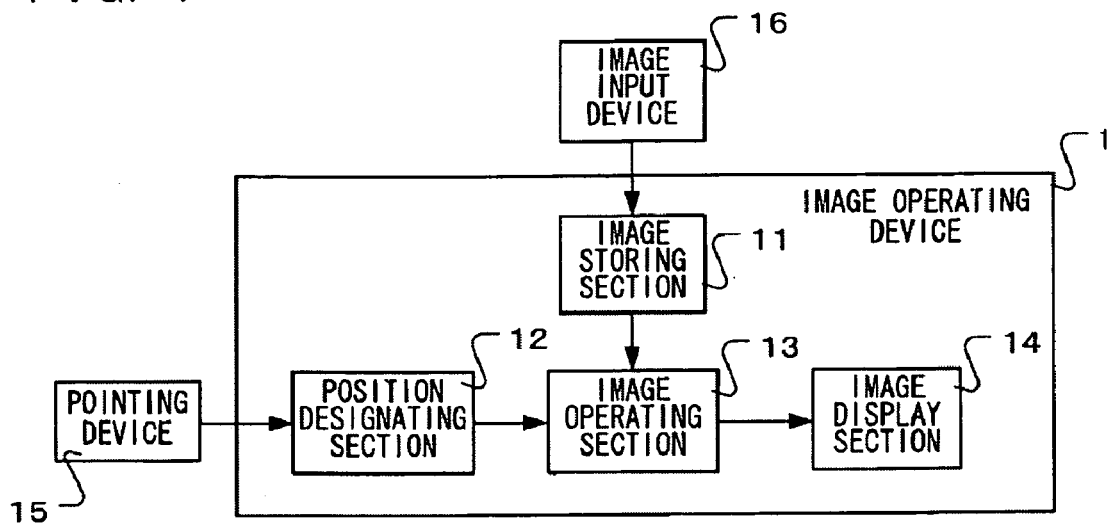
FIG. 1 is a block diagram illustrating an image operating device according to an embodiment of the present invention.

DESCRIPTION OF THE REFERENCE CHARACTERS 1 image operating device
11 image storing section
12 position designating section
13 image operating section
14 image display section
21 map image
22 pointer image
23 pointer
24 movement mode area
25 area boundary image
26 enlargement-reduction-rotation center point image
27 enlargement-reduction-rotation mode area
28 auxiliary pointer image

DETAILED DESCRIPTION OF THE INVENTION

Embodiment

Hereinafter, an embodiment of the present invention will be described in detail with reference to the drawings.

FIG. 1 is a block diagram illustrating an overall configuration of an image operating device according to the embodiment of the present invention. In FIG. 1, the image operating device 1 comprises an image storing section 11, a position designating section 12, an image operating section 13, and an image display section 14.

The image storing section 11 stores a map image 21 for displaying a map in a manner desired by a user, and a pointer image 22 for indicating an operation position of the map image 21 displayed on the image display section 14. The pointer image 22 is a translucent image having a hand shape, for example. As the map image 21, an image having a size sufficiently larger than that of a display area of the image display section 14 is used. Thus, in the case where a movement operation or a reduction operation is performed, any portion not displaying the map image 21 will not be generated on the image display section 14. Also, in the case where the reduction operation is performed on the map image 21 such that the display of the map image 21 will not become coarse when an enlargement operation is performed on the map image 21, any portion not displaying the map image 21 will not be generated on the image display section 14. Furthermore, because the pointer image 22 is an image of a hand shape, the user is allowed to perform an intuitive image operation as if he or she operates the map image 21 with his or her own hand. Also, by using a translucent image as the pointer image 22, the user can always recognize an operation position without the map image 21 being concealed.

The position designating section 12 acquires, from a pointing device 15 to which a signal point is inputted, information of an operation position of an image on the image display section 14 and of a button being pressed. The pointing device 15 is a mouse, a track ball, a touch panel or a touch pad, for example. Note that a multi-point input device capable of simultaneously designating a plurality of points is also available as the pointing device. In the present invention, however, it is unnecessary to use an expensive and complex multi-point input device, and a function of a single point input device is sufficient for the present invention, thereby making it possible to configure the image operating device at a low cost.

Based on the operation position information and the button pressed information acquired from the position designating section 12, the image operating section 13 selects an image processing method of moving, enlarging and reducing, or rotating the map image 21 stored in the image storing section 11. Then, the image operating section 13 calculates a movement distance, an enlargement and reduction rate, a rotational center, or a rotational angle of the map image 21 so as to perform an image processing thereon, and displays the pointer image 22 on a screen based on the position information acquired from the position designating section 12.

With these operations, the user can view any portion of the map image 21 at any position in any size, being rotated by any angle, thereby making it possible to display an image in a mode aimed at identifying geographic information on a map.

The image display section 14 is formed of an area (image display means) in its entirety or a portion thereof, the area in which a display device (monitor), such as a liquid crystal monitor or projector, can display an image outputted from the image operating section 13 or information required for performing processes in the present embodiment.

Note that any image may be used as an image, stored in the image storing section 11, on which an image operation is performed. For example, a photo, an illustration, a music album cover or the like are stored as the image, and a size of the image maybe smaller than that of the image display section. Furthermore, an image stored as the pointer image 22 is not limited to a hand shape image. A marker or illustration representing an arrow, a circle, a rectangle, a cross, a small cross or the like may be used as the image, and the image is preferably an image such as a translucent image or an image having a frame shape, which would not obstruct the user from viewing an image on which the image operation is performed.

Alternatively, an image input device 16 such as a camera may be connected to the image operating device 1 so as to regularly capture an image as the pointer image 22 and causes the image storing section 11 to store the captured image. Then, the image operating section 13 executes a clipping process of clipping an image of a hand out of the captured image or an image process of making the image of the hand translucent, whereby an image operation may be performed while displaying an image of a hand of the user in real time on the image display section 14, for example. Furthermore, a position of a forefinger, for example, of the image of the hand may be detected so as to be used as an operation position of the pointing device 15 or a touch panel may be additionally provided so as to use the button pressed information of the pointing device 15, thereby allowing the user to feel as if he or she directly performs an image operation with his or her own hand and thus it becomes possible to provide an intuitive image operating device with a significantly improved operation feeling.

Still alternatively, a communication device may be connected to the image operating device 1 so as to download an image. In this case, because an image is acquired via communication, it is possible to display the latest map or music album cover, or display a popular image as the pointer image 22, and thus the user can enjoy an image as he or she likes as appropriate.

When a mouse operation is not performed, the pointer image 22 may not be visible. In this case, when the user recognizes an image without performing an image operation, he or she can recognize only a target image without being obstructed by other images, thereby improving a convenience of the user.

Next, an outline of an operation of the image operating device 1 having the configuration mentioned above will be described with reference to FIG. 2.

Figure 3:
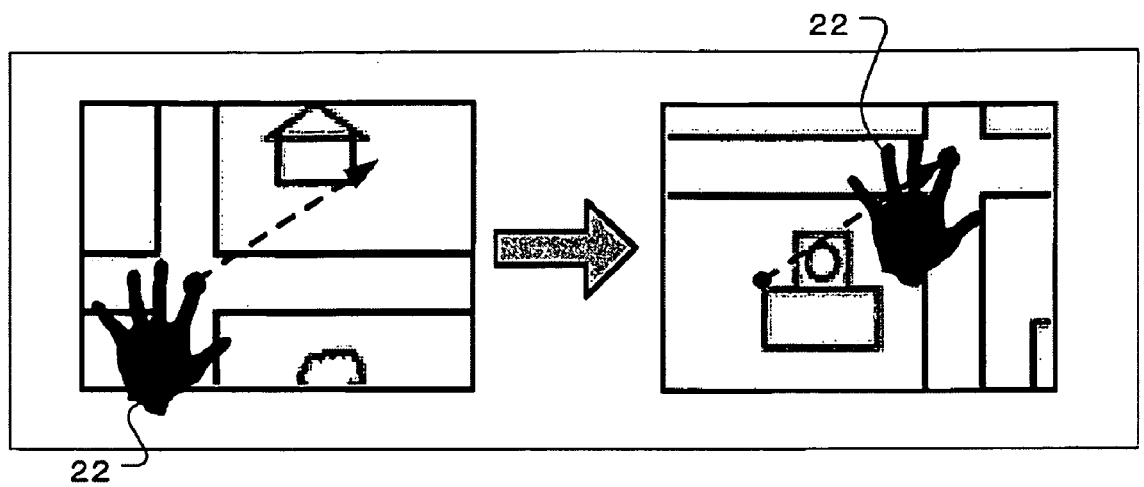
FIG. 3 is an operation diagram of the movement mode.

On the image display section 14, the map image 21 stored in the image storing section 11 is displayed as an operation image, and a translucent image having a left-hand shape is displayed as the pointer image 22. When the user performs an operation of moving a mouse, the position designating section 12 detects the mouse being moved so as to output operation position information to the image operating section 13. Based on the information outputted from the position designating section 12, the image operating section 13 modifies a display position of the pointer image 22 being currently displayed on the image display section 14 to an appropriate position so as to display the pointer image 22 at the position thereon. For example, when the user performs an operation of moving the mouse up, down, left or right, the pointer image 22 is to be displayed on the image display section 14, being moved up, down, left or right in response to the mouse having been moved. Next, when the user performs a button operation using the mouse, the position designating section 12 detects button operation information of the mouse so as to output the position information and the button operation information of the mouse to the image operating section 13. Based on the position information acquired from the position designating section 12, the image operating section 13 performs a movement process or an enlargement-reduction-rotation process on the map image 21 and displays, on the image display section 14, the map image 21 on which the aforementioned process has been performed with the pointer image 22 being superimposed thereon. For example, when a mouse button is pressed down in an area inside of a specified boundary, a movement mode is selected as an image operating method. As shown from a left image to a right image of FIG. 3, an entirety of the map image 21 moves on the image display section 14, sticking to a left hand as the pointer image 22 until the mouse button is released.

Figure 4:
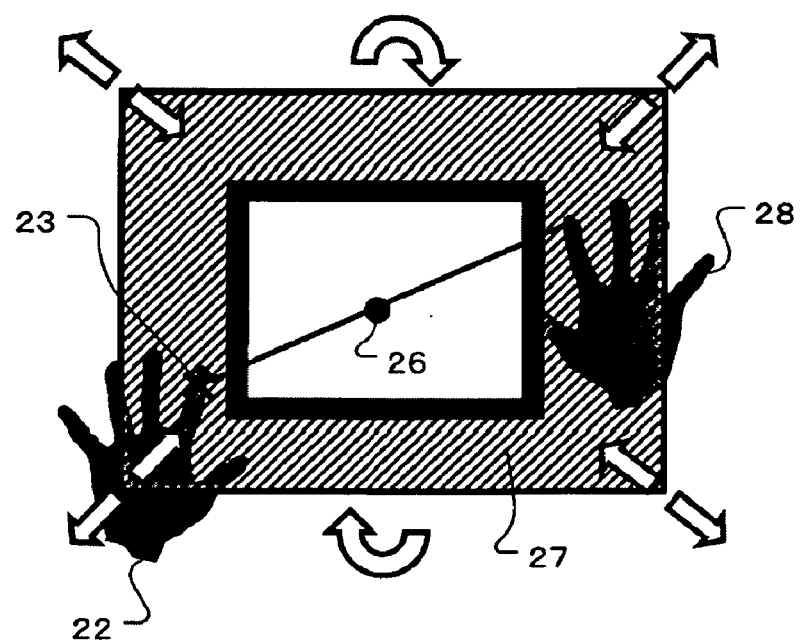
FIG. 4 is a diagram describing an enlargement-reduction-rotation mode.
Figure 5:
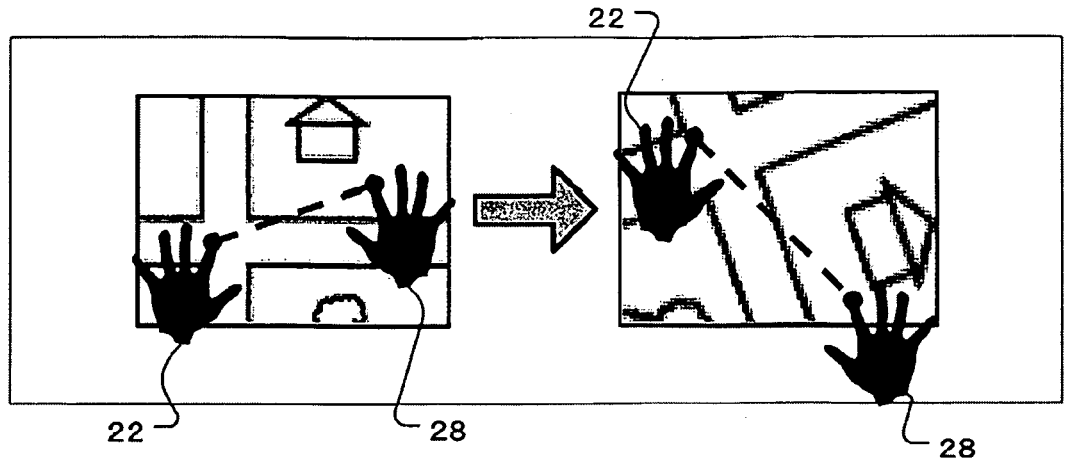
FIG. 5 is an operation diagram of the enlargement-reduction-rotation mode.
Figure 6:
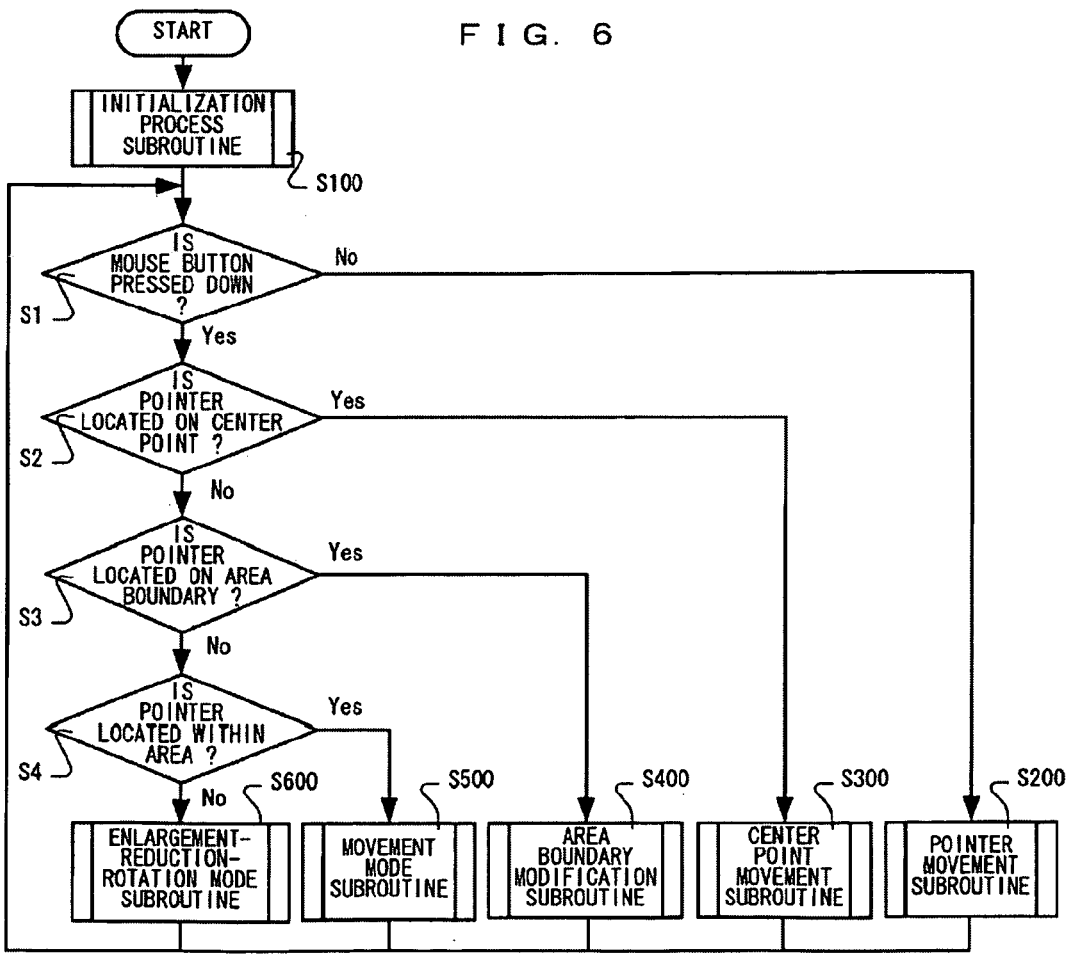
FIG. 6 is a flowchart illustrating an operation of the image operating device.

Furthermore, when the mouse button is pressed down in an area outside of the specified boundary as shown in FIG. 4, an enlargement-reduction-rotation mode is selected as the image operating method. As shown from a left image to a right image of FIG. 5, the enlargement-reduction-rotation process is performed on the map image 21, with the entirety thereof being stuck to the left hand as the pointer image 22 until the mouse button is released. In the enlargement-reduction-rotation mode, an auxiliary pointer image 28, which is a horizontally flipped image of the pointer image 22, is displayed at a position symmetrical to the pointer image 22 with respect to a center point of enlargement, reduction or rotation. For example, it is assumed that a center of the image display section 14 is set as a center of enlargement, reduction or rotation. In this case, as shown in FIG. 4, when the pointer image 22 simulating a left hand is displayed at the lower-left corner on the image display section 14, the auxiliary pointer image 28 simulating a right hand is displayed at the upper-right corner on the image display section 14. In the enlargement-reduction-rotation mode, the enlargement, reduction or rotation is performed on the map image 21 with a center of the map image 21 sticking to the center of the image display section 14 which is the center point of the enlargement, reduction or rotation, and with a point, on the map image 21, pressed down by the mouse button sticking to a position of the left hand of the pointer image 22. An enlargement-reduction ratio is equal to a ratio of a distance between a position of a pointer 23 to be varied in accordance with the mouse being moved and a center point 26 of the image display section 14 to a distance between a position of the pointer 23 at which the mouse button is pressed down and the center point of the image display section 14. For example, it is assumed that position coordinates of the center point 26 are (0, 0), and position coordinates of the pointer 23 at which the mouse button is pressed down are (−100, 0) when a rightward direction of the image display section 14 is an x-axis positive direction and an upward direction of the screen display section 14 is a y-axis positive direction. In this case, when the position coordinates of the pointer 23 move to (0, 50) with the mouse button being pressed down, the map image 21 is displayed so as to be reduced to a half size while keeping an aspect ratio and to be rotated clockwise by 90 degrees with respect to a position at which the mouse button is pressed. Due to this image operation, a position, on the map image 21, of the pointer image 22 at which the mouse button is pressed down remains unchanged during the enlargement-reduction-rotation process. In this case, because the auxiliary pointer image 28 simulating the right hand is displayed at a position, on the image display section 14, symmetrical to the pointer image 22, the position coordinates of the auxiliary pointer image 28 accordingly move from (100, 0) to (0, −50). Similarly, the auxiliary pointer image 28 is also displayed, sticking to a single point on the map image 21 during a time period from when the mouse button is pressed down to when the mouse button is released.

Such an image operation is always performed on the map image 21 while the mouse button is being pressed down, thus allowing the user to recognize an operation center point with no need to display the point and also providing the user with a feeling as if he or she performs an image operation with the map image 21 being stuck to his or her own hand and thereby making it possible to realize an intuitive operation feeling.

Figure 2:
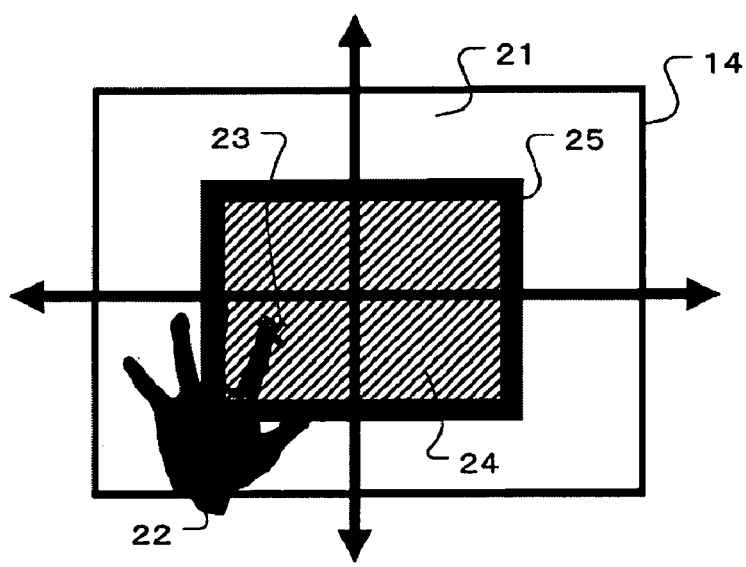
FIG. 2 is a diagram describing a movement mode.

Along the boundary of the area used for selecting the image operating method, there is an area for displaying a frame-shaped area boundary image 25 having a predetermined width, as shown in FIG. 2. When the pointer image 22 is located on the area in which the area boundary image 25 is displayed, the area boundary image 25 is displayed on the image display section 14. On the other hand, when the pointer image 22 is located on an area other than the aforementioned area, the area boundary image 25 is not displayed on the image display section 14 and invisible to the user. Once the mouse button is pressed down on the area boundary image 25, a boundary line sticks to the pointer image 22, and a shape thereof is enlarged, reduced or rotated in a similar manner to the map image 21 being enlarged, reduced or rotated, until the mouse button is released. Note that the pointer image 22 is not displayed on the image display section 14 when the pointer image 22 is not located on the area in which the area boundary image 25 is displayed, thereby allowing the user to easily view the map image 21. However, the pointer image 22 may be displayed all the time depending on the preference of the user. Furthermore, because the user can recognize a selected image operating method from the number of images of hands to be displayed when the mouse button is pressed down, the area boundary image 25 may not be displayed at all.

Note that in FIG. 2 and FIG. 4, as a shape of the boundary line for shifting the image operating method, a reduced shape of the image display section 14 is used. However, the shape of the boundary line may be a reduced shape of an image displayed on the display section 14 and also included in the display area thereof, an elliptical shape having a center of the image display section 14 as its center, or any other shapes. Alternatively, the shape of the boundary line may also be an elliptical shape having, as its center, a center point or a barycentric point of a shape of an image displayed on the image display section 14 and also included in the display area thereof. As the number of images to be displayed when the mouse button is pressed down, it is natural to use two images of right and left hands when using an image simulating a hand. However, when using any images other than a hand such as a marker or an illustration, three or more images may be used. In this case, in order to differentiate an image indicating an operation position from other images, it is desirable to use different sizes, colors, permeabilities or rotational angles, to perform a mirror image processing, or to use images completely different from each other.

Note that when three or more images are displayed, those images are displayed at equal intervals there between along a concentric circle having a radius equal to a distance between the image indicating the operation position and the center of enlargement, reduction or rotation, and having the center of enlargement, reduction, or rotation as its center, thereby allowing the user to understand the center point of enlargement, reduction or rotation more easily than the case where two images are used. In the present embodiment, the number of the pointer images 22 is modified in accordance with an operation method. If the operation method can be recognized, the pointer image 22 may be displayed by using a different size, color, permeability or rotational angle, or may be displayed by being modified to a completely different image or displayed with other images combined therewith. Furthermore, if an image simulating a right hand is used as the pointer image 22 when an operation position is located in the right half of the screen, and an image simulating a left hand is used as the pointer image 22 when the operation position is located in the left half of the screen, the pointer image 22 is displayed in accordance with a position of the mouse, thereby making it possible to provide the user with a more intuitive operation feeling.

At initial start-up of the image operating device, the position information and enlargement-reduction-rotation process information of the map image 21 displayed on the image display section 14, and information of the pointer image 22 and a display position thereof are previously designated in the image operating section 13. However, from a second and subsequent start-ups, each piece of the information obtained when an immediately preceding processing was performed may be stored in order to assist the user in understanding the map information displayed on the image display section 14 more promptly. Preferably, a translucent image is used as the pointer image 22 such that the user can more easily recognize the map image, and when the mouse operation is not performed, the pointer image 22 is not visible, thereby allowing the user to more easily understand the map image 21.

Hereinafter, a detailed operation of the image operating device 1 will be described with reference to FIG. 6 to FIG. 11. An overall operation of the image operating device 1 will be initially described with reference to a flowchart shown in FIG. 6.

Figure 7:
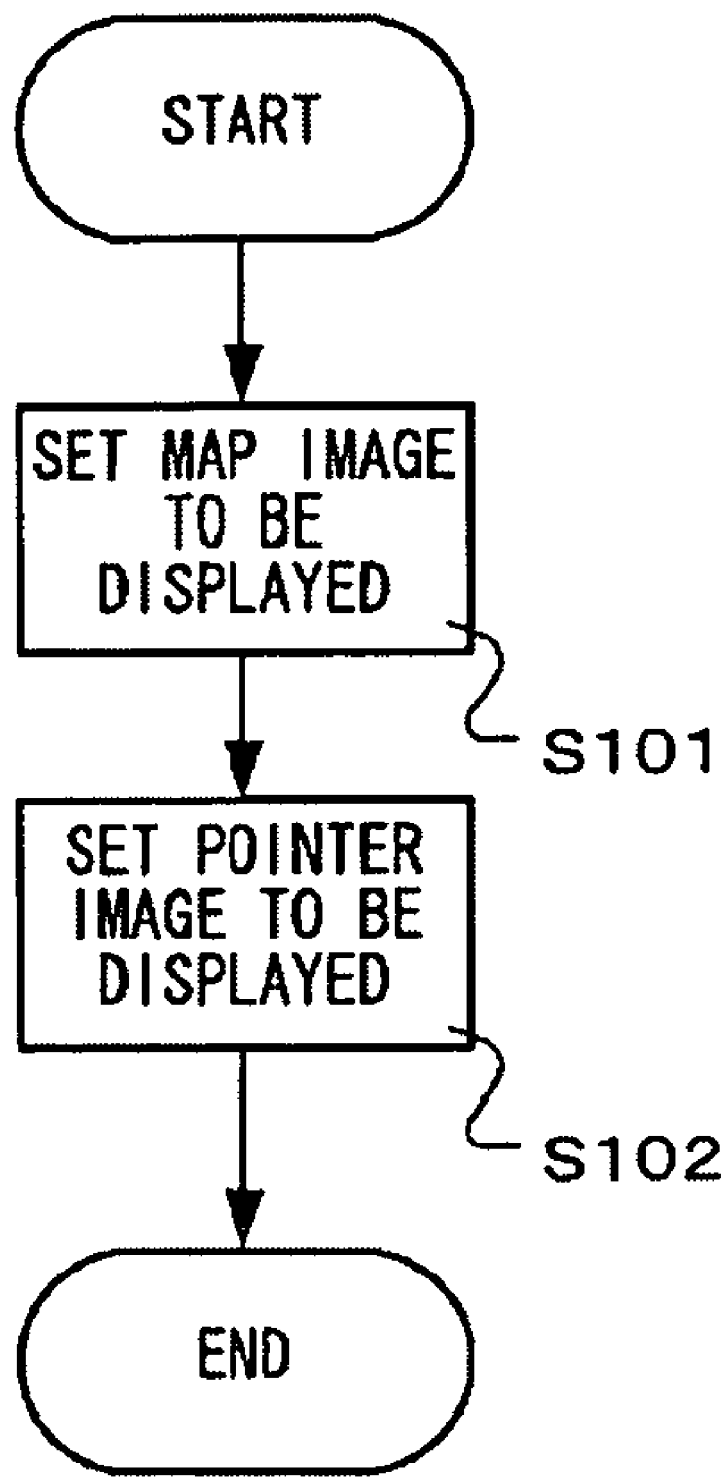
FIG. 7 is a flowchart illustrating an initialization process.

Firstly, the image operating section 13 executes an initialization process (step S100). The initialization process will be described in detail with reference to an initialization process subroutine shown in FIG. 7. FIG. 7 is a flowchart illustrating a detailed process to be initially executed when the image operating device 1 starts up.

In FIG. 7, the image operating section 13 sets the map image 21 stored in the image storing section 11 so as to be displayed on the image display section 14 as a target image of an image operation (step S101) and also sets a translucent image of a left hand shape so as to be displayed on the image display section 14 as the pointer image 22 indicating a position of the image operation (step S102). In this case, an image display parameter, such as a size, a position or a rotational angle, used for displaying each of the images is previously set in the image operating section 13. For example, the map image is displayed such that a center of the map image is located at the center of the image display section 14 and such that no enlargement-reduction-rotation process is performed thereon, and the pointer image is displayed such that a point at the tip of a forefinger of the left hand image (herein after, referred to as a pointer) is located at the center of the image display section 14 and such that no enlargement-reduction-rotation process is performed thereon. The pointer indicates not only a position of the pointer image but also a position at which the image operation is currently performed. Note that the order of step S101 and step S102 may be reversed.

Next, the image operating section 13 determines whether or not the mouse button is pressed down (step S1).

Figure 8:
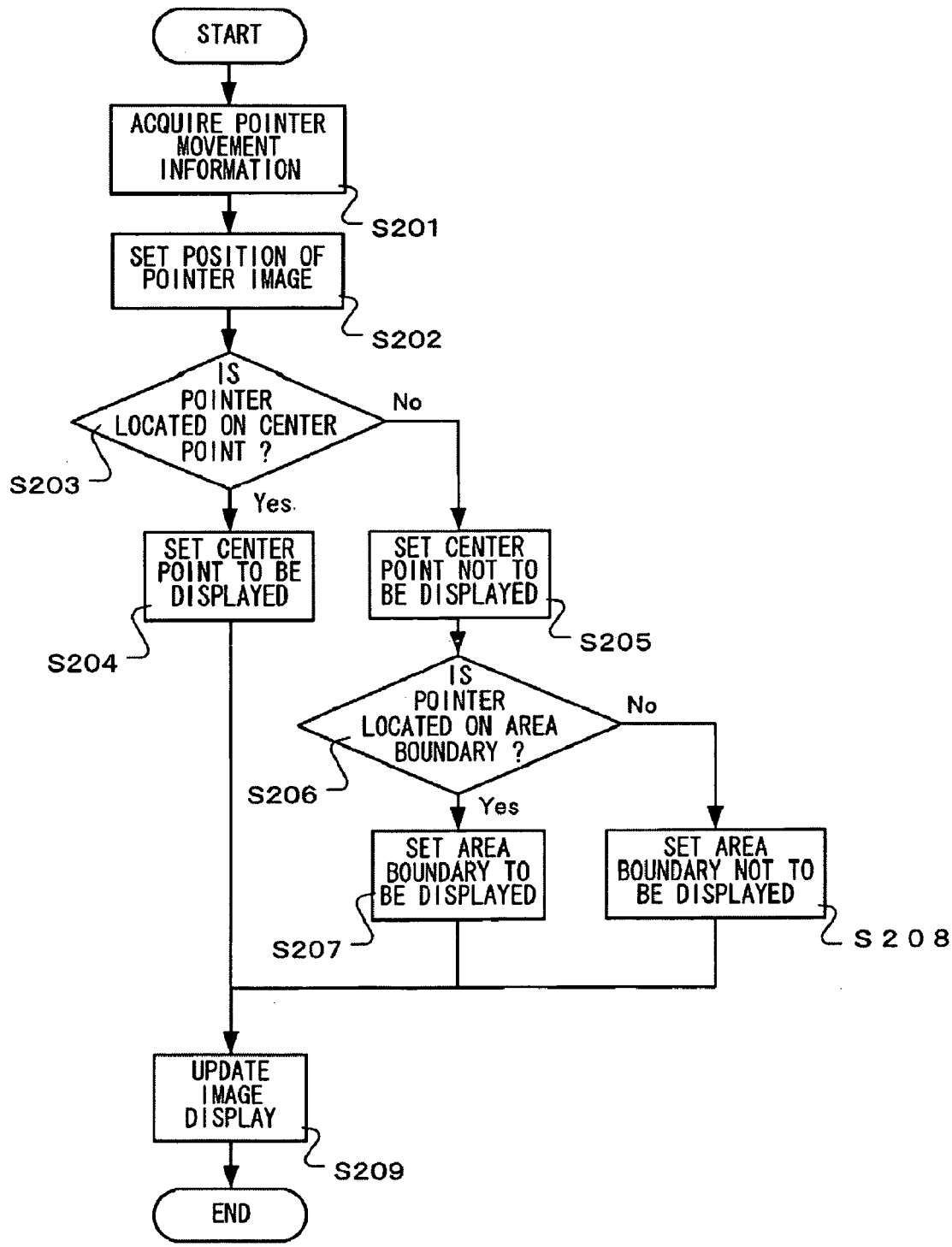
FIG. 8 is a flowchart illustrating a pointer movement subroutine.

In step S1, when it is determined that the mouse button is not pressed down, the image operating section 13 executes a pointer movement process (step S200). In the pointer movement process, pointer movement information, which is required for an image processing of a map image operation, is acquired. The pointer movement process will be described in detail with reference to a pointer movement subroutine shown in FIG. 8. FIG. 8 is a flowchart illustrating a detailed movement process of the pointer image to be executed when the user moves the pointer of the mouse and a detailed process of setting whether to display the center point image 26 and the area boundary image 25.

In FIG. 8, the position designating section 12 acquires movement operation information of the pointer 23 from the mouse (step S201), and the image operating section 13 executes a process of setting display positions of the pointer 23 and the pointer image 22 in accordance with the movement operation information of the mouse (step S202). The display positions are set such that when the mouse is moved up, down, left or right, the positions of the pointer 23 and the pointer image 22 are accordingly moved up, down, left or right, for example.

Next, the image operating section 13 determines whether or not the pointer 23 is located on an area of the center point image 26 (step S203). In this case, the center point image 26 may not be displayed, and only the area in which the center point image 26 is displayed is used for the determination.

In step S203, when it is determined that the pointer 23 is located on the area of the center point image 26, the image operating section 13 sets the translucent image 26 indicating the center point of enlargement, reduction or rotation so as to be displayed on the image display section 14 (step S204) and then proceeds to step S209.

On the other hand, in step S203, when it is determined that the pointer 23 is not located on the area of the center point image 26, the image operating section 13 sets the center point image 26 so as not to be displayed on the image display section 14 (step S205), and further determines whether or not the pointer 23 is located on an area of the area boundary image 25 (step S206). In this case, the area boundary image 25 may not be displayed, and only the area in which the area boundary image 25 is displayed is used for the determination.

In step S206, when it is determined that the pointer 23 is located on the area of the area boundary image 25, the image operating section 13 sets the area boundary image 25 so as to be displayed on the image display section 14 (step S207).

On the other hand, in step S206, when it is determined that the pointer 23 is not located on the area of the area boundary image 25, the image operating section 13 sets the area boundary image 25 so as not to be displayed on the image display section 14 (step S208).

Then, the image operating section 13 displays, on the image display section 14, the images such as the map image 21 or the pointer image 22 at positions, in sizes and in the superimposition order, all of which have been set for the respective images (step S209) and then finishes the pointer movement subroutine (step S200). Note that when the pointer 23 is located neither on the area of the center point image 26 nor on the area of the area boundary image 25, the center point image 26 and the area boundary image 25 are not to be displayed on the image display section 14.

In step S1, when it is determined that the mouse button is pressed down, the image operating section 13 determines whether or not the pointer 23 is located on the area of the circular-shaped translucent image 26 indicating the center point of enlargement, reduction or rotation (herein after, referred to as center point image 26) (step S2).

Figure 9:
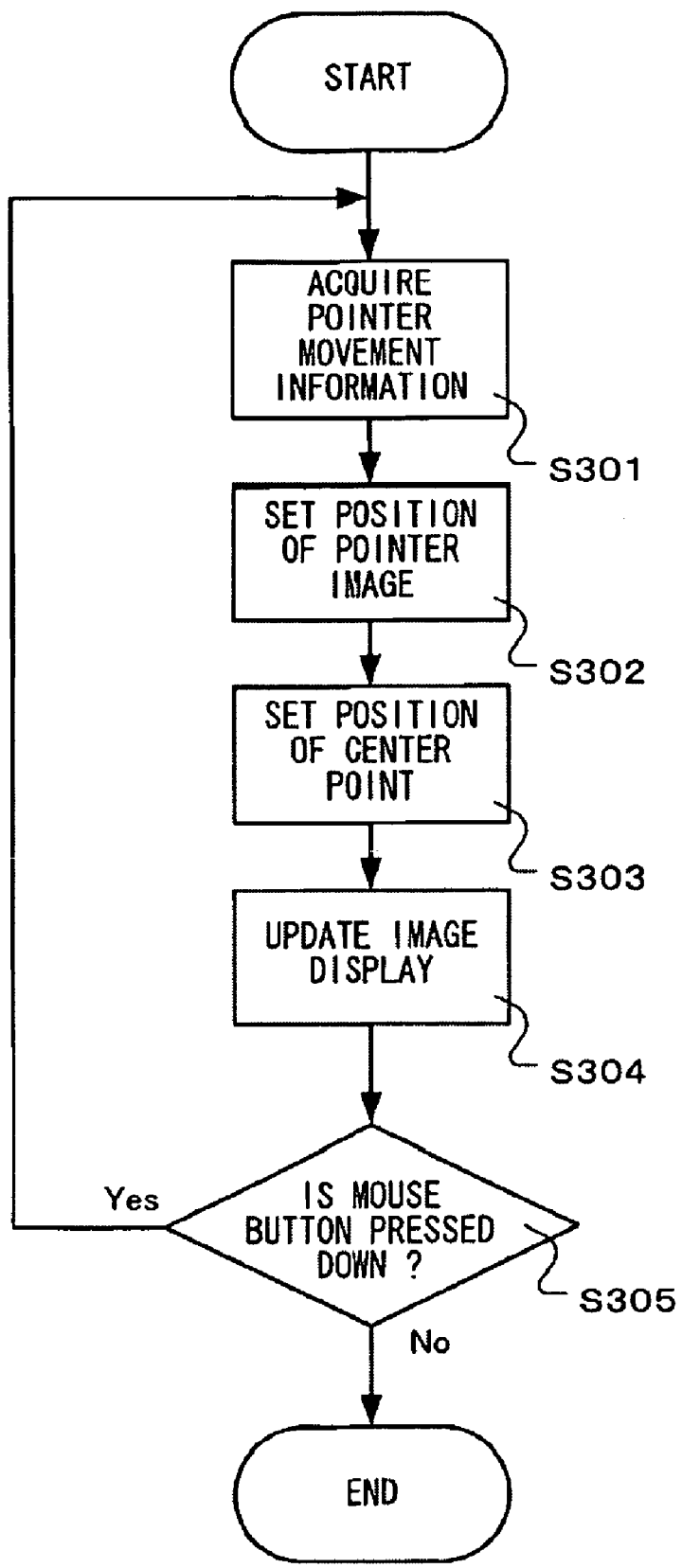
FIG. 9 is a flowchart illustrating a center point movement subroutine.

In step S2, when it is determined that the pointer 23 is located on the area of the center point image 26, a center point movement process (step S300) is executed. The center point movement process will be described in detail with reference to a center point movement subroutine shown in FIG. 9. FIG. 9 is a flowchart illustrating a detailed process to be executed when in moving the center point 26, the user enlarges, reduces or rotates the map image centered on the center point 26.

In FIG. 9, the position designating section 12 acquires the movement operation information of the pointer 23 from the mouse (step S301), and the image operating section 13 executes the process of setting the display positions of the pointer 23 and the pointer image 22 in accordance with the movement operation information of the mouse (step S302). The display positions are set such that when the mouse is moved up, down, left or right, the positions of the pointer 23 and the pointer image 22 are accordingly moved up, down, left or right, for example.

Next, by using the movement operation information of the mouse, the image operating section 13 sets the position of the center point image 26 to a position moved by the same amount as the pointer (step S303). For example, when it is assumed that the position coordinates of the center point image 26 are (200, 100) and the pointer coordinates are moved by (5, −3), the position coordinates of the center point image 26 is to be set as (205, 97) by adding (5, −3) to the original position coordinates.

Then, the image operating section 13 displays, on the image display section 14, the images such as the map image 21 or the pointer image 22 at positions, in sizes and in the superimposition order, all of which have been set for the respective images (step S304). Thereafter, the image operating section 13 determines whether or not the mouse button is pressed down (step S305).

In step S305, when it is determined that the mouse button is not pressed down, the image operating section 13 finishes the center point movement subroutine (S300). On the other hand, when it is determined that the mouse button is pressed down, the image operating section 13 repeats the process from the step (step S301) of acquiring the movement information of the pointer.

In step S2, when it is determined that the pointer 23 is not located on the area of the center point image 26, the image operating section 13 determines whether or not the pointer 23 is located on the area boundary image 25 used for designating an image operating method (step S3).

Figure 10:
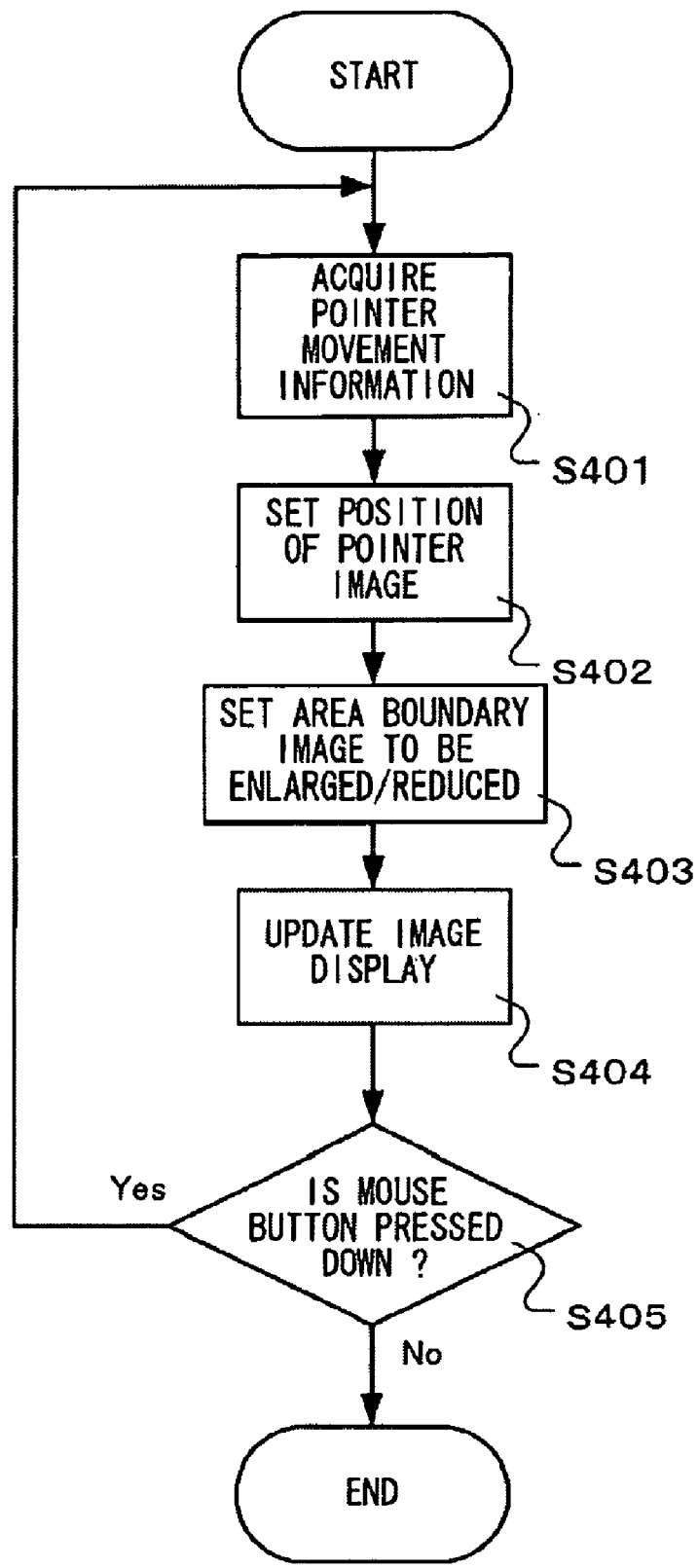
FIG. 10 is a flowchart illustrating an area boundary modification subroutine.

In step S3, when it is determined that the pointer 23 is located on the area boundary image 25, an area boundary modification process (step S400) is executed. The area boundary modification process will be described in detail with reference to an area boundary modification subroutine shown in FIG. 10. FIG. 10 is a flowchart illustrating a detailed process to be executed when modifying a boundary of the area used in the case where the user selects a mode where the map image is moved or a mode where the map image is enlarged, reduced or rotated.

In FIG. 10, the position designating section 12 acquires the movement operation information of the pointer 23 from the mouse (step S401), and the image operating section 13 executes the process of setting the display positions of the pointer 23 and the pointer image 22 in accordance with the movement operation information of the mouse (step S402). The display positions are set such that when the mouse is moved up, down, left or right, the positions of the pointer 23 and the pointer image 22 are accordingly moved up, down, left or right, for example (step S402).

Next, by using the movement operation information of the mouse, the image operating section 13 modifies a size of the area boundary image 25 so as to set the modified size thereof (step S403). Then, the image operating section 13 displays, on the image display section 14, the images such as the map image 21, the pointer image 22 or the area boundary image 25 at positions, in sizes and in the superimposition order, all of which have been set for the respective images (step S404). Thereafter, the image operating section 13 determines whether or not the mouse button is pressed down (step S405).

In step 405, when it is determined that the mouse button is not pressed down, the image operating section 13 finishes the area boundary modification subroutine (S400). On the other hand, when it is determined that the mouse button is pressed down, the image operating section 13 repeats the process from the step (step S401) of acquiring the movement information of the pointer.

In step S3, when it is determined that the pointer 23 is not located on the area boundary image 25, the image operating section 13 determines whether or not the pointer 23 is located on an area 24 for designating a movement mode as the image operating method (step S4).

Figure 11:
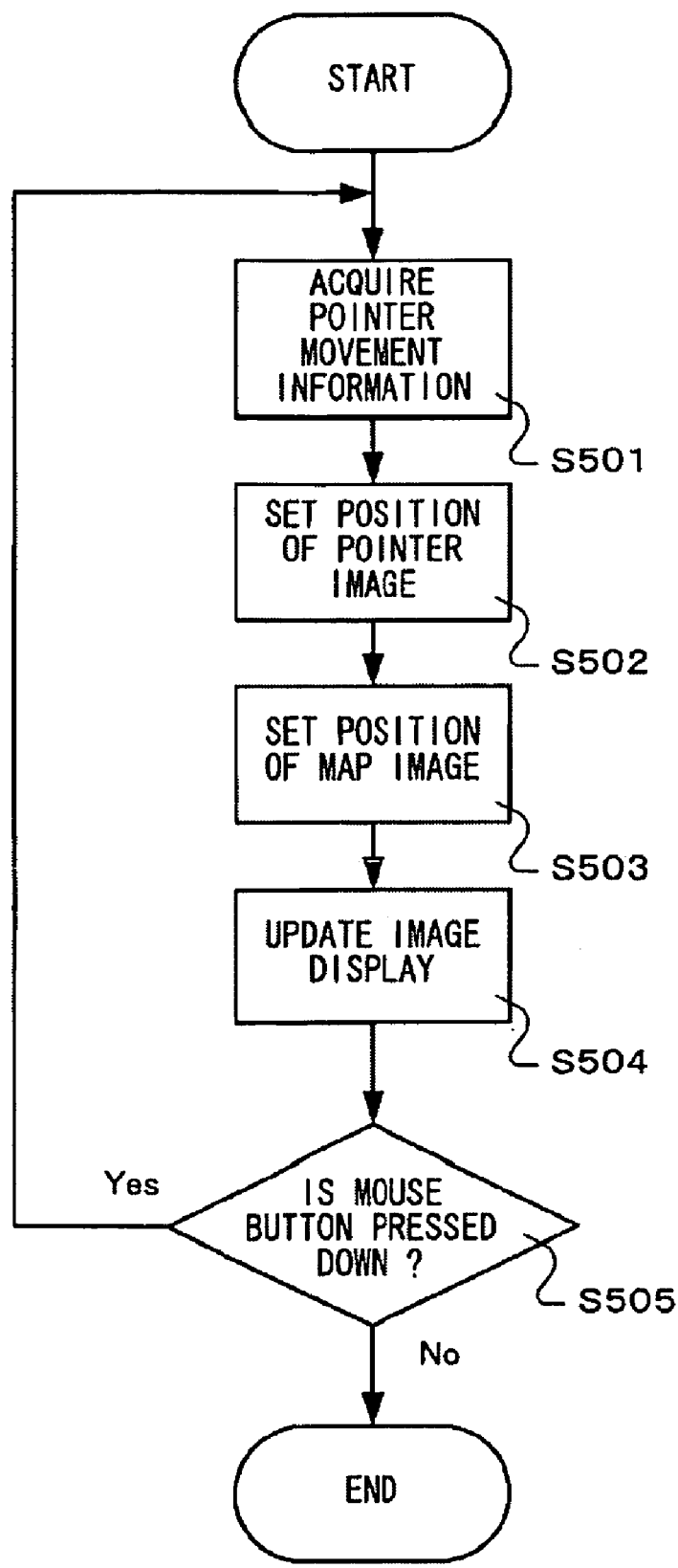
FIG. 11 is a flowchart illustrating a movement mode subroutine.

In step S4, when it is determined that the pointer 23 is located on the area 24 for designating the movement mode, a movement mode process (step S500) is executed. The movement mode process will be described in detail with reference to a movement mode subroutine shown in FIG. 11. FIG. 11 is a flowchart illustrating a detailed process to be executed when the user moves the map image.

In FIG. 11, the position designating section 12 acquires the movement operation information of the pointer 23 from the mouse (step S501), and the image operating section 13 executes the process of setting the display positions of the pointer 23 and the pointer image 22 in accordance with the movement operation information of the mouse (step S502). The display positions are set such that when the mouse is moved up, down, left or right, the positions of the pointer 23 and the pointer image 22 are accordingly moved up, down, left or right, for example.

Next, by using the movement operation information of the mouse, the image operating section 13 sets the position of the map image 21 to a position moved by the same amount as the pointer (step S503). For example, when it is assumed that the position coordinates of the map image 21 are (200, 100) and the pointer coordinates are moved by (5, −3), the position coordinates of the map image 21 is to be set as (205, 97) by adding (5, −3) to the original position coordinates.

Then, the image operating section 13 displays, on the image display section 14, the images such as the map image 21 or the pointer image 22 at positions, in sizes and in the superimposition order, all of which have been set for the respective images (step S504). Thereafter, the image operating section 13 determines whether or not the mouse button is pressed down (step S505).

In step S505, when it is determined that the mouse button is not pressed down, the image operating section 13 finishes the movement mode subroutine (S500). On the other hand, when it is determined that the mouse button is pressed down, the image operating section 13 repeats the process from the step (step S501) of acquiring the movement information of the pointer.

Figure 12:
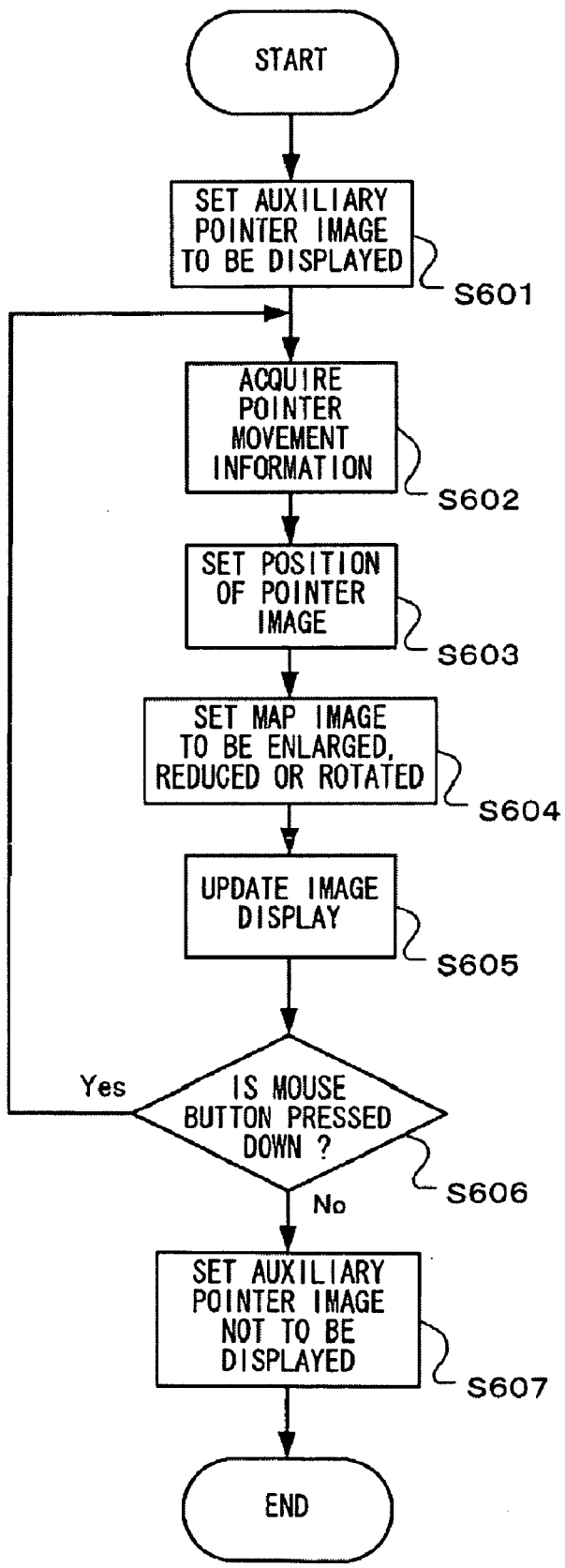
FIG. 12 is a flowchart of an enlargement-reduction-rotation mode subroutine.

In step S4, when it is determined that the pointer 23 is not located on the area 24 for designating the movement mode, an enlargement-reduction-rotation mode process (step S600) is executed. The enlargement-reduction-rotation mode process will be described in detail with reference to an enlargement-reduction-rotation subroutine shown in FIG. 12. FIG. 12 is a flowchart illustrating a detailed process to be executed when the user performs the enlargement-reduction-rotation process on the map image.

In FIG. 12, the position designating section 12 sets the auxiliary pointer image 28 so as to be displayed at a position symmetrical to the position of the pointer 23 with respect to the center point 26 of the enlargement-reduction-rotation operation (step S601).

Next, the movement operation information of the pointer 23 is acquired from the mouse (step S602), and the image operating section 13 executes the process of setting the display positions of the pointer 23 and the pointer image 22 in accordance with the movement operation information of the mouse (step S603). The display positions are set such that when the mouse is moved up, down, left or right, the positions of the pointer 23 and the pointer image 22 are accordingly moved up, down, left or right, for example.

Then, by using the movement operation information of the mouse, the image operating section 13 modifies a size of the map image 21 so as to set the modified size thereof, and also modifies a rotational angle of the map image 21 so as to set the modified rotational angle thereof (step S604). Thereafter, the image operating section 13 displays, on the image display section 14, the images such as the map image 21 or the pointer image 22 at positions, in sizes and in the superimposition order, all of which have been set for the respective images (step S605). Then, the image operating section 13 determines whether or not the mouse button is pressed down (step S606).

In step S606, when it is determined that the mouse button is not pressed down, the image operating section 13 sets the auxiliary pointer image 28 so as not to be visible (step S607) and finishes the enlargement-reduction-rotation mode subroutine (S600). On the other hand, when it is determined that the mouse button is pressed down, the image operating section 13 repeats the process from the step (step S602) of acquiring the movement information of the pointer.

Any of the pointer movement subroutine (step S200), the center point movement subroutine (step S300), the area boundary modification subroutine (step S400), the movement mode subroutine (step S500), and the enlargement-reduction-rotation mode subroutine (step S600) is executed, the image operating device 1 repeats from the process (step S1) of determining whether the mouse button is pressed down.

Next, image operation parameters, of each image stored in the image storing section 11, retained in the image operating section 13 will be described with reference to FIG. 13.

FIG. 13 represents the image operation parameters of each image retained in the image operating section 13. In FIG. 13, a position represents a position on the image display section 14 for displaying an image, a rotational angle represents a rotational angle of a rotational operation which is previously performed when an image is displayed, a width and height represent a width and height of an image when the image is displayed, and display ability represents whether an image is displayed or not. For example, whether an image is displayed can be set by setting a display ability parameter of each image stored in the image operating section 13 to TRUE. Note that an image in which the display ability parameter is set to FALSE is not displayed on the image display section 14.

Taking a case of FIG. 13 as an example, the image operating section 13 firstly performs an image operation of enlarging or reducing the map image 21 so as to have a width of 800 and a height of 600, and then performs an image operation of rotating the map image 21, which has been enlarged or reduced, clockwise by 45 degrees so as to be displayed at a position (0, 0) on the image display section 14. Similarly, an image operation is performed on a left hand image based on the image operation parameters so as to be displayed on the image display section 14. A right hand image is not displayed on the image display section 14 because a display ability parameter thereof is FALSE.

Furthermore, the present invention is also achieved when a program of software that realizes the above-described embodiment (a program compliant with the flowcharts shown in the diagrams in the present embodiment) is supplied to a device, and a computer of the device reads the supplied program to be executed. Therefore, in order to realize a functional processing of the present invention by using a computer, a program itself installed in a computer also realizes the present invention. In other words, the present invention includes an image operating program for realizing a functional processing of the present invention.

As described above, according to the present invention, it becomes possible to provide an image operating device, an image operating method and an image operating program, all of which are inexpensive and capable of allowing the user to understand to what extent the image operation of movement, enlargement and reduction, rotation or the like is performed on an image.

The configuration described in the above embodiment merely indicates a specific example and is not restrictive of the technical scope of the present invention. Any configuration can be employed within the scope of exerting the effect of the present invention.

INDUSTRIAL APPLICABILITY

As describe above, an image operating device, an image operating method and an image operating program according to the present invention are capable of allowing a user to intuitively perform an image operation. Therefore, the image operating device, the image operating method and the image operating program according to the present invention are applicable to an in-vehicle navigation device or the like.

The invention claimed is:

1. An image operating device that performs an operation on a display image, comprising:
    an image display section for displaying an image on a screen;
    an image operating section for performing a predetermined image operation on the image displayed on the image display section;
    a position designating section for designating a first point which is any point on the screen by means of a single-point input device and for further designating a position, on the screen, to where the first point is to be moved as a result of the image operation performed by the image operating section; and
    a pointer display section for displaying a first pointer image at a position corresponding the first point designated by the position designating section, and for further displaying a second pointer image at a position symmetrical to the first pointer image with respect to a center point of rotation and/or enlargement and reduction when the image operation of rotation and/or enlargement and reduction is performed by the image operating section.

2. The image operating device according to claim 1, wherein
    at least one of the pointer images is an image captured by a camera.

3. The image operating device according to claim 1, wherein
    the two pointer images are horizontally flipped shapes of each other.

4. The image operating device according to claim 1, wherein
    the two pointer images are images of hands, one of which represents a left hand and the other of which represents a right hand.

5. The image operating device according to claim 4, wherein
    the pointer image on a left side of the center point is the image of the left hand, and the pointer image on a right side of the center point is the image of the right hand.

6. The image operating device according to claim 1, wherein
    when the image operating section performs the image operation of rotation and/or enlargement and reduction, the image operation is performed centered on a center of the image display section as the center point.

7. The image operating device according to claim 1, wherein
    the center point can be set at any position.

8. The image operating device according to claim 7, wherein
    the image operating section does not perform the image operation when the center point is designated by the position designating section, and modifies a position of the center point to a position subsequently designated by the position designating section.

9. The image operating device according to claim 1, wherein
    the image operating section determines an image operating method depending on whether or not the first point designated by the position designating section is located within a predetermined area of the image displayed on the image display section.

10. The image operating device according to claim 9, wherein
    the predetermined area has a reduced shape of the image displayed on the image display section and also included in a display area thereof.

11. The image operating device according to claim 9, wherein
    the predetermined area has an elliptical shape centered on a center point or a barycentric point of a shape of the image displayed on the image display section and also included in a display area thereof.

12. The image operating device according to claim 9, wherein
    any position and/or any shape can be set for the predetermined area.

13. The image operating device according to claim 12, wherein
    the image operating section does not perform the image operation when a position on a boundary of the predetermined area or on an area indicating the boundary of the predetermined area is designated by the position designating section, and changes the position on the boundary or on the boundary area to a position subsequently designated by the position designating section so as to modify the boundary or the boundary area.

14. An image operating method of performing an operation on a display image, comprising:
    an image display step of displaying an image on a screen;
    an image operating step of performing a predetermined image operation on the image displayed by the image display step;
    a position designating step of designating a first point which is any point on the screen by means of a single-point input device and of further designating a position, on the screen, to where the first point is to be moved as a result of the image operation performed by the image operating step; and
    a pointer display step of displaying a first pointer image at the position corresponding to the first point designated by the position designating step, and of further displaying a second pointer image at a position symmetrical to the first pointer image with respect to a center point of rotation and/or enlargement and reduction when the image operation of rotation and/or enlargement and reduction is performed by the image operating step.

15. A non-transitory computer readable medium having an image operating program embodied thereon to be executed by a computer of an image operating device that performs an operation on a display image, wherein
    the image operating program instructs the computer to execute:
    an image display step of displaying an image on a screen;
    an image operating step of performing a predetermined image operation on the image displayed by the image display step;

a position designating step of designating a first point which is any point on the screen by means of a single-point input device and of further designating a position, on the screen, to where the first point is to be moved as a result of the image operation performed by the image operating step; and a pointer display step of displaying a first pointer image at the position corresponding to the first point designated by the position designating step, and of further displaying a second pointer image at a position symmetrical to the first pointer image with respect to a center point of rotation and/or enlargement and reduction when the image operation of rotation and/or enlargement and reduction is performed by the image operating step.

* * * * *